United States Patent
Lee

(10) Patent No.: US 6,980,356 B2
(45) Date of Patent: Dec. 27, 2005

(54) OPTICAL AMPLIFIER AND METHOD THEREOF

(75) Inventor: Moon-Seob Lee, Kyounggi-Do (KR)

(73) Assignee: LG Electronics Inc., Seoul (KR)

(*) Notice: Subject to any disclaimer, the term of this patent is extended or adjusted under 35 U.S.C. 154(b) by 373 days.

(21) Appl. No.: 10/284,186

(22) Filed: Oct. 31, 2002

(65) Prior Publication Data

US 2003/0123136 A1 Jul. 3, 2003

(30) Foreign Application Priority Data

Dec. 28, 2001 (KR) .................. 10-2001-0087516

(51) Int. Cl.$^7$ .......................................... H04B 10/12
(52) U.S. Cl. .................. 359/341.41; 359/349
(58) Field of Search .................. 359/337.1, 341.32, 359/341.41

(56) References Cited

U.S. PATENT DOCUMENTS

| | | | | |
|---|---|---|---|---|
| 6,104,527 A * | 8/2000 | Yang | ..................... | 359/341.33 |
| 6,201,637 B1 * | 3/2001 | Nilsson et al. | .......... | 359/341.33 |
| 6,233,092 B1 * | 5/2001 | Flood et al. | .................. | 359/345 |
| 6,288,834 B1 * | 9/2001 | Sugaya et al. | ............ | 359/341.1 |
| 6,307,668 B1 * | 10/2001 | Bastien et al. | .......... | 359/337.1 |
| 6,317,254 B1 * | 11/2001 | Park et al. | ............. | 359/337.13 |
| 6,411,431 B2 * | 6/2002 | Sugaya et al. | ............ | 359/341.1 |
| 6,437,907 B1 * | 8/2002 | Yoon et al. | ............. | 359/341.32 |
| 6,501,594 B1 * | 12/2002 | Hwang et al. | ......... | 359/341.32 |
| 6,504,647 B1 * | 1/2003 | Shigematsu | ............... | 359/341.3 |
| 6,507,430 B2 * | 1/2003 | Yenjay | ................... | 359/341.31 |
| 6,563,630 B1 * | 5/2003 | Jacob et al. | ............. | 359/341.2 |
| 6,570,701 B1 * | 5/2003 | Hwang et al. | ........... | 359/341.1 |
| 6,731,426 B2 * | 5/2004 | Yeniay et al. | .......... | 359/341.32 |
| 6,738,182 B2 * | 5/2004 | Inagaki et al. | ........... | 359/337.1 |
| 2002/0003655 A1 * | 1/2002 | Park et al. | ............... | 359/341.1 |
| 2002/0141045 A1 * | 10/2002 | Inagaki et al. | ........... | 359/341.1 |
| 2002/0159132 A1 * | 10/2002 | Grochocinski et al. | ..... | 359/334 |
| 2003/0035204 A1 * | 2/2003 | Ahn et al. | ............... | 359/341.3 |

FOREIGN PATENT DOCUMENTS

EP            1263097 A2 * 12/2002        ........... H01S 3/067

* cited by examiner

Primary Examiner—Jack Keith
Assistant Examiner—Eric Bolda
(74) Attorney, Agent, or Firm—Fleshner & Kim LLP

(57) ABSTRACT

In an optical amplifier and a method thereof, and in particular to a wavelength division multiplexing system using a C-band optical signal and a L-band optical signal, by using a portion of a C-band optical signal filtered out during gain flattening as a pump optical signal for amplification of an L-band optical signal, optical components required by prior systems for providing a pump optical signal to an L-band optical signal amplifier are not required. Accordingly, the present invention reduces the number of required optical components. In addition, by using the portion of the C-band optical signal filtered out during gain flattening, energy usage efficiency is improved.

23 Claims, 3 Drawing Sheets

OPTICAL AMPLIFIER AND METHOD THEREOF

BACKGROUND OF THE INVENTION

1. Field of the Invention

The present invention relates to a WDM (wavelength division multiplexing) system, and in particular to an optical amplifier and a method thereof.

2. Background of the Related Art

Because the need for bandwidth has increased tremendously, it seems impossible to satisfy future bandwidth need with present Internet or asynchronous transfer mode (ATM) technologies. Accordingly, new technologies capable of providing broader bandwidth are required. Optical communication technology has emerged as one type of technology for satisfying these bandwidth needs.

A wavelength division multiple (WDM) method transmits a plurality of channels simultaneously by using different wavelength beams for optical communication.

A wavelength division multiplexing (WDM) optical communication network includes a transmitter for converting data into an optical signal and transmitting it; an optical transmission channel for transmitting the optical signal to a reception side; and a receiver for restoring the optical signal into the original data. The data can be an audio signal, a video signal or digital data.

When long distance communication of an optical signal is performed in an optical communication network, the optical signal is gradually weakened by, for example, noise around an optical transmission channel.

Accordingly, in order to compensate for transmission loss of the optical signal transmitted through the optical transmission channel, an optical amplifier is installed in the optical transmission channel. Among optical amplifiers, a rate-earth element doped optical amplifier using a rare-earth element doped optical fiber as an optical waveguide to amplify light is commonly used.

In a WDM system, the C-band and the L-band are the lowest loss wavelength band of the optical fiber. C-band transmission utilizes the upper and lower 15 nm bandwidth on the basis of 1550 nm band, and L-band transmission utilizes the upper and lower 15 nm bandwidth on the basis of 1590 nm band. Among rare-earth element doped optical fiber amplifiers, an erbium-doped fiber amplifier (EDFA) can amplify light in the C-band and the L-band, which are the lowest loss wavelength bands.

FIG. 1 illustrates a construction of a conventional optical amplifier in a WDM optical communication network. As depicted in FIG. 1, the conventional optical amplifier includes an EDFA 10 for amplifying an input optical signal, a gain flattening filter 20 for flattening a gain of the input optical signal that is amplified in the EDFA 10, a pump laser diode (PLD) 30 for outputting a pump optical signal that provides optical energy for amplifying the optical signal outputted from the gain flattening filter 20, a coupler 40 for combining the optical signal outputted from the gain flattening filter 20 with the pump optical signal outputted from the PLD 30, an isolator 50 for receiving an output optical signal from the coupler 40, outputting it in one direction, removing a portion of the optical signal cut off during the gain flattening, and removing noise that arises during the optical amplification (for example, amplified spontaneous emission (ASE)).

The EDFA 10 includes an isolator 11 for transmitting an input optical signal in one direction, a PLD 12 for outputting a pump optical signal that provides the optical energy required to amplify the input optical signal outputted from the isolator 11, a coupler 13 for combining the input optical signal outputted from the isolator 11 with the pump optical signal outputted from the pump laser diode 12 by a WDM method, and an erbium-doped fiber (EDF) for amplifying the input optical signal using the pump optical signal.

The operation of the conventional optical amplifier will now be described. When the input optical signal is applied, the isolator 11 of the EDFA 10 transmits the input optical signal in one direction to the coupler 13. The PLD 12 outputs the pump optical signal for providing the optical energy required for amplifying the input optical signal.

The coupler 13 combines the input optical signal passing through the isolator 11 with the pump optical signal by a WDM method. The EDF 14 amplifies the input optical signal by using the pump optical signal passing through the coupler 13.

The EDF 14 exhibits gain characteristics that vary as a function of wavelength. Specifically, as depicted in FIG. 2, the amplification gain characteristics of the EDFA 10, are such that the short wavelength band (1520 nm–1570 nm) experiences relatively high gain, and the long wavelength band (1570 nm–1620 nm) experiences relatively low gain.

In a WDM system that includes the EDFA 10, when the wavelength of the optical signal is varied, the optical amplification, the SNR (signal to noise ratio), and thus the transmission quality is varied. As a result, the receiving side of the WDM system experiences difficulties in sensitivity adjustment, noise procession and level adjustment, resulting in a lowering of the performance of the entire system.

In order to solve the above-mentioned problems, the gain flattening filter 20 is used to flatten the gain provided by the EDFA 10. In more detail, the gain flattening filter 20 reduces the amplification (gain) of all the output signals amplified in the EDFA 10 to match the amplification level of the lowest output signal. The gain flattening filter 20 accomplishes this by cutting off any portion of an output signal that is higher than the level of the lowest output signal.

The isolator 50 outputs the output optical signal filtered in the gain flattening filter 20, and absorbs/removes that portion of an optical signal cut off in the gain flattening, as well as spontaneous emission light generated by the optical amplification provided by the EDFA 10.

As described above, based on the wavelength that exhibits the lowest amplification level, the conventional optical amplifier removes optical signal levels that are greater than the lowest amplification level. As a result, the amplification efficiency of the amplifier is lowered.

In addition, a WDM system using both a C-band optical signal and a L-band optical signal includes both a C-band optical signal amplifier and a L-band optical signal amplifier. Because the C-band optical signal amplifier and the L-band optical amplifier respectively include optical components for providing a pump optical signal, it is difficult to reduce the number of the optical components in such a conventional WDM system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide an optical amplifier and a method thereof that is capable of improving an optical amplification efficiency in a WDM system.

It is another object of the present invention to provide an optical amplifier and a method thereof that is capable of reducing the number of optical components and improving an amplification efficiency in a WDM system that includes a C-band optical signal amplifier and a L-band optical signal amplifier, by using a portion of a C-band optical signal filtered out by a gain flattening filter as a pump optical signal for amplifying an L-band optical signal.

It is yet another object of the present invention to provide an optical amplifier and a method thereof capable of reducing the number of optical components and improving an amplification efficiency in a WDM system that includes a first WDM optical signal amplifier and a second WDM optical signal amplifier, by using a portion of a first WDM optical signal filtered out by a gain flattening filter as a pump optical signal for amplifying a second WDM optical signal.

To achieve these advantages, in whole or in part, there is provided an optical amplifier, including a first erbium-doped fiber amplifier (EDFA) for amplifying a first input optical signal; a gain flattening filter for flattening a gain imparted on the first optical signal by the first EDFA and outputting light reflected as a result of the gain flattening; a second EDFA for amplifying the optical signal gain-flattened by the gain flattening filter; a coupler for combining the reflected light with a second input optical signal; and a third EDFA for amplifying the second input optical signal by using the reflected light outputted from the coupler as a first pump optical signal.

To achieve these advantages, in whole or in part, there is further provided an optical amplifier, including a first C-band erbium-doped fiber amplifier (EDFA) for amplifying a C-band input optical signal; a gain flattening filter for flattening a gain of the amplified C-band input optical signal and outputting a filtered portion of the amplified C-band input optical signal and spontaneous emission light generated by the amplification of the C-band input optical signal in the first C-band EDFA; a second C-band EDFA for further amplifying the amplified and gain-flattened C-band input optical signal; a first coupler for combining an L-band input optical signal, the filtered portion of the amplified C-band input optical signal and the spontaneous emission light; and an L-band EDFA for amplifying the L-band input optical signal by using the filtered portion of the amplified C-band input optical signal and the spontaneous emission light as a first pump optical signal.

To achieve these advantages, in whole or in part, there is further provided an optical amplifier, including a gain flattening filter for flattening a gain of an optically amplified first input optical signal and outputting light reflected during the gain flattening; a coupler for combining the reflected light with a second input optical signal; and a rare earth element doped optical fiber amplifier for amplifying the second input optical signal by using the reflected light as a first pump optical signal.

To achieve at least these advantages, in whole or in part, there is further provided a method for amplifying an L-band optical signal including the steps of amplifying a C-band input optical signal; flattening a gain of the optically amplified C-band input optical signal and outputting light reflected during the gain flattening; combining an L-band input optical signal with the reflected light; and amplifying the L-band input optical signal by using the reflected light as a pump optical signal.

To achieve these advantages, in whole or in part, there is further provided an optical amplifier, including a gain flattening filter for gain flattening an optically amplified first input optical signal by filtering out a portion of the optically amplified first input optical signal; and an amplifier in optical communication with the gain flattening filter for amplifying a second input optical signal using the filtered portion of the optically amplified first input optical signal as an optical pump.

To achieve these advantages, in whole or in part, there is further provided a method of amplifying a first optical signal, including the steps of amplifying a second optical signal; gain flattening the amplified second optical signal by filtering out a portion of the amplified second optical signal; and amplifying the first optical signal using the filtered portion of the amplified second optical signal as an optical pump.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
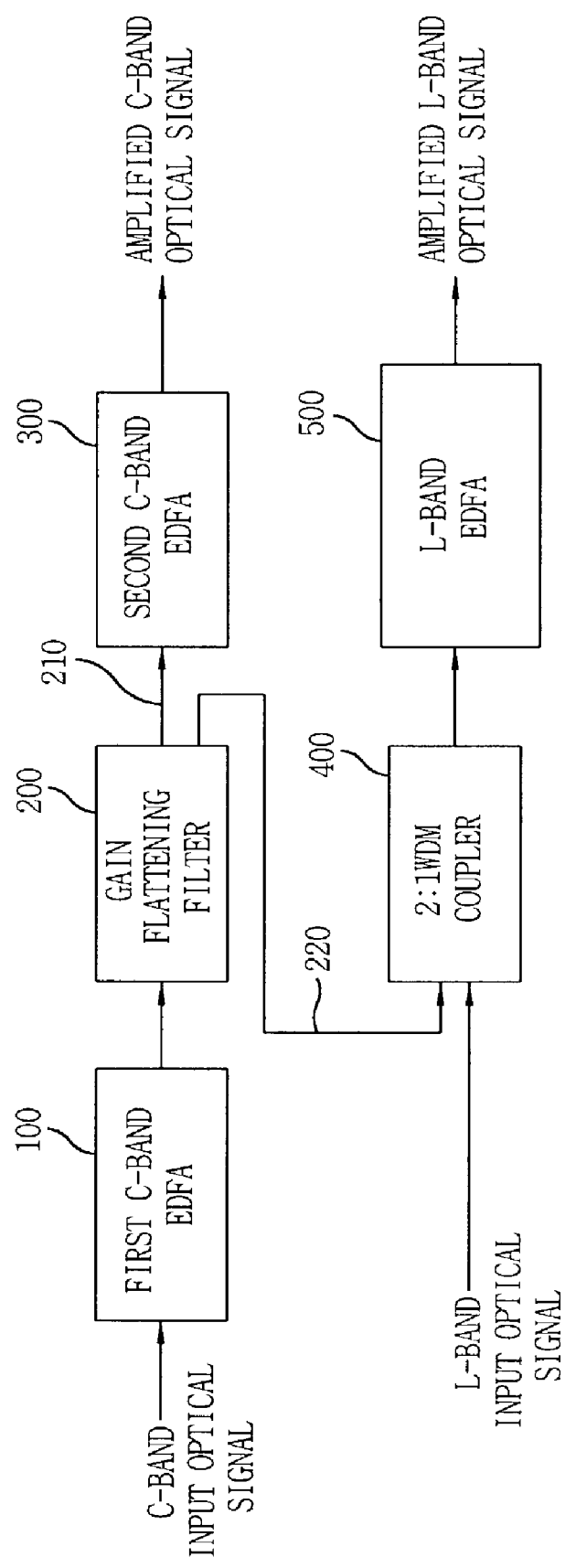
FIG. 3 is a block diagram of an optical amplifier, in accordance with one embodiment of the present invention.

Hereinafter, the preferred embodiments of the present invention will be described with reference to the accompanying drawings. FIG. 3 is a block diagram illustrating a construction of an optical amplifier in accordance with the present invention. As depicted in FIG. 3, the optical amplifier of the present invention includes a first C-band EDFA 100 for amplifying a C-band input optical signal in order to lower a noise figure (NF), a gain flattening filter 200 for flattening a gain of the input optical signal that is amplified in the first C-band EDFA 100 and outputting a portion 220 of the input optical signal filtered by the gain flattening filter 200 as a result of the gain flattening, a second C-band EDFA 300 for amplifying an optical signal 210 gain-flattened by the gain flattening filter 200 and thereby adjusting the size of the gain, a first coupler 400 for combining the filtered input optical signal portion 220 outputted from the gain flattening filter 200 with an L-band input optical signal, preferably by a WDM method, and an L-band EDFA 500 for amplifying the L-band input optical signal using the filtered input optical signal portion 220 outputted by the first coupler 400 as a first pump optical signal. The filtered input optical signal portion 220 includes the optical signal flattened by the gain flattening, and may also include spontaneous emission light generated during the optical amplification.

Figure 1:
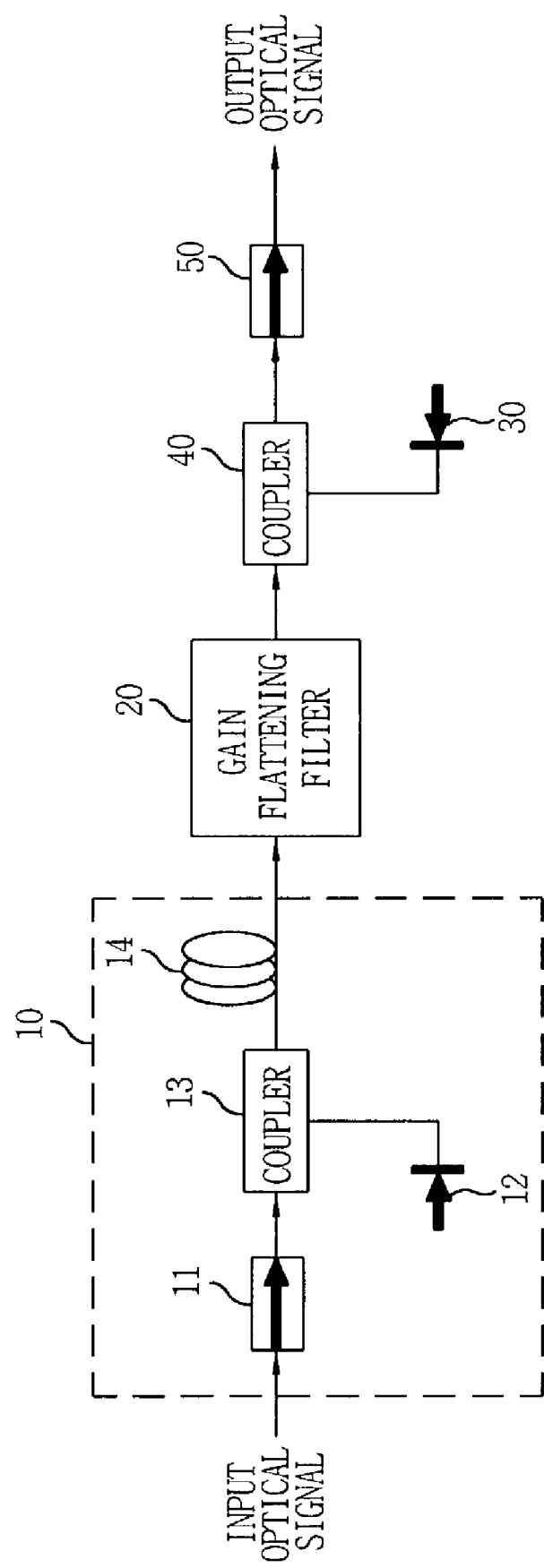
FIG. 1 is a block diagram illustrating the construction of a conventional optical amplifier in a WDM optical communication network.

The first and the second C-band EDFAs 100, 300 and the L-band EDFA 500 can have the same construction as the EDFA 10 shown in FIG. 1. Specifically, the first and the second C-band EDFAs 100, 300 respectively include an isolator for one-way transmission of a C-band input optical signal, a PLD for outputting a second pump optical signal for providing optical energy required in amplification of the input optical signal outputted from the isolator, a second coupler for combining the C-band input optical signal outputted from the isolator with the second pump optical signal outputted from the PLD, preferably by a WDM method, and an erbium-doped fiber (EDF) for amplifying the C-band input optical signal using the second pump optical signal.

The L-band EDFA 500 includes an isolator for one-way transmission of an L-band input optical signal, a PLD for outputting a third pump optical signal for providing optical energy required in amplification of the input optical signal outputted from the isolator, a third coupler for combining the C-band input optical signal outputted from the isolator with the third pump optical signal outputted from the PLD, preferably by a WDM method, and an EDF for amplifying the L-band input optical signal using the third pump optical signal.

The operation of the optical amplifier of the present invention will now be described. When the optical amplifier of the present invention receives a C-band input optical signal, the first C-band EDFA 100 amplifies the C-band input optical signal in order to lower the NF. The operation of the first C-band EDFA 100 is the same as that of the EDFA 100 shown in FIG. 1, and thus its operation will not be described again.

Figure 2:
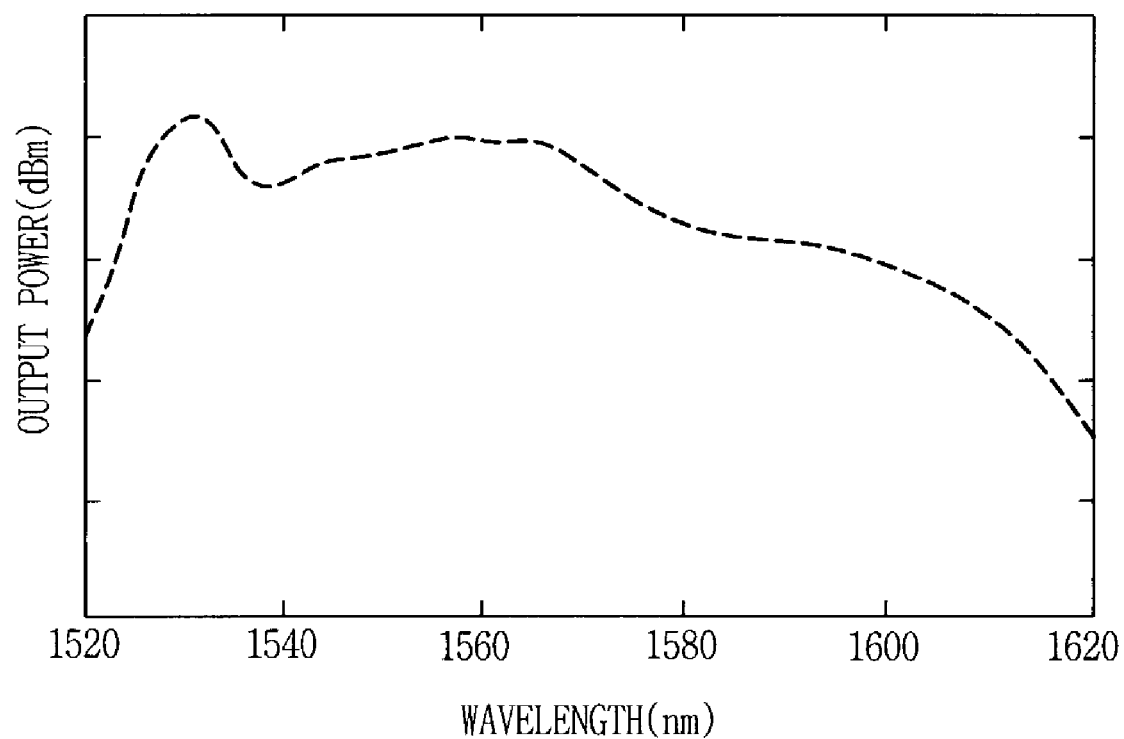
FIG. 2 is a graph illustrating the optical signal amplification gain characteristics of the conventional EDFA shown in FIG. 1.

As depicted in FIG. 2, the amplification gain characteristics of the EDFA 100 are such that the short wavelength band (1520 nm–1570 nm) experiences relatively high gain, and the long wavelength band (1570 nm–1620 nm) experiences relatively low gain. In addition, the amplification gain characteristics of the first C-band EDFA 100 are such that the gain for the 1530 nm band is greater than the gain for the 1550 nm band.

Accordingly, when the wavelength of the optical signal is varied, the optical amplification, the SNR, and thus the transmission quality is varied. As a result, the receiving side of the WDM system experiences difficulties in sensitivity adjustment, noise procession and level adjustment, resulting in a lowering of the performance of the entire system. In order to solve these amplification gain characteristics problems, a gain flattening filter 200 is used.

In order to flatten the gain of the C-band input optical signal that is amplified in the first C-band EDFA 100, the gain flattening filter 200 filters out any portion of the C-band input optical signal whose power is higher than the power of that portion of the C-band input optical signal that experiences the lowest amplification. In a preferred embodiment, the gain flattening filter 200 flattens the gain of the C-band input optical signal outputted from the first C-band EDFA 100 by filtering out amplification levels greater than the 1540 nm amplification level.

The gain flattening filter 200 outputs a C-band optical signal 210, having a flat gain profile to the second C-band EDFA 300, and outputs the signal portion 220 filtered by the gain flattening. The gain flattening filter 200 typically filters the optical signal via reflection. Thus the filtered portion 220 is typically a portion reflected by the gain flattening filter 200. The second C-band EDFA 300 amplifies the C-band optical signal 210 outputted from the gain flattening filter 200.

The first coupler 400 receives the L-band input signal and the filtered portion 200 outputted from the gain flattening filter 200, combines them, preferably by a WDM method and outputs the combined signal to the L-band EDFA 500. The L-band EDFA 500 amplifies the L-band optical signal outputted from the first coupler 400 by using the filtered portion 220 outputted from the first coupler 400 as the pump optical signal.

As described above, the optical amplifier of the present invention uses the optical signal portion 220 filtered by the gain flattening filter 200 of the C-band optical amplifier, preferably by reflection, as a pump optical signal for the L-band optical amplifier 500.

As described above, in an optical amplifier and a method thereof in accordance with the present invention, by using the optical signal portion of a first band type (e.g., C-band), filtered by the gain flattening filter, as the pump optical signal for amplifying an optical signal of a second band type (e.g. L-band) in a WDM optical amplifying system that includes an optical signal amplifier for the first band and an optical signal amplifier for the second band, it is possible to improve an optical amplification efficiency of the optical signal amplifier for the second band and improve energy usage efficiency by using the filtered optical signal portion as an optical pump.

In addition, certain optical components, such as a PLD, etc., for providing a pump optical signal for amplifying the second band optical signal are not required in the present invention, thus reducing the number of required optical components.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical amplifier, comprising: a first erbium-doped fiber amplifier (EDFA) configured for amplifying a first input optical signal so that a gain is imparted on the first input optical signal; a gain flattening filter configured for flattening a gain imparted on the first input optical signal by the first EDFA and outputting light reflected as a result of the gain flattening; a second EDFA for amplifying the optical signal gain-flattened by the gain flattening filter; a coupler for combining the reflected light with a second input optical signal; and a third EDFA configured for amplifying the second input optical signal by using the reflected light outputted from the coupler as a first pump optical signal.

2. The optical amplifier of claim 1, wherein the reflected light comprises a portion of the first input optical signal filtered by the gain flattening filter and spontaneous emission light generated by the optical amplification of the first input optical signal in the first EDFA.

3. The optical amplifier of claim 1, wherein the first input optical signal comprises a C-band wavelength division multiplexing (WDM) optical signal, and the second input optical signal comprises a L-band WDM optical signal.

4. The optical amplifier of claim 1, wherein the first and the second EDFAs respectively comprise: an isolator for one-way transmission of the first input optical signal; a pump laser diode for outputting a second pump optical signal; a couplet for combining the first input optical signal outputted from the isolator with the second pump optical signal outputted from the PLD; and an erbium-doped fiber (EDF) configured for amplifying the first input optical signal by using the second pump optical signal.

5. The optical amplifier of claim 1, wherein the third EDFA includes: an isolator for one-way transmission of the second input optical signal; a pump laser diode for outputting a third pump optical signal; a coupler for combining the second input optical signal outputted from the isolator with the third pump optical signal outputted from the PLD; and an erbium-doped fiber (EDF) configured for amplifying the second input optical signal by using the third pump optical signal.

6. An optical amplifier, comprising: a first C-band erbium-doped fiber amplifier (EDFA) for amplifying a C-band input optical signal so that a gain is imparted on the first C-band input optical signal; a gain flattening filter configured for flattening a gain of the amplified C-band input optical signal and outputting a filtered portion of the amplified C-band input optical signal and spontaneous emission light generated by the amplification of the C-band input optical signal in the first Cband EDFA; a second C-band EDFA configured for further amplifying the amplified and gain flattened C-band input optical signal; a first coupler for combining an L-band input optical signal, the filtered portion of the amplified C-band input optical signal and the spontaneous emission light; and an L-band EDFA configured for amplifying the L-band input optical signal by using the filtered portion of the amplified C-band input optical signal and the spontaneous emission light as a first pump optical signal.

7. The optical amplifier of claim 6, wherein the first and the second C-band EDFA respectively comprise: an isolator for one-way transmission of the C-band input optical signal; a pump laser diode for outputting a second pump optical signal; a second coupler for combining the C-band input optical signal outputted from the isolator with the second pump optical signal outputted from the PLD; and an erbium-doped fiber (EDF) configured for amplifying the C-band input optical signal by using the second pump optical signal.

8. The optical amplifier of claim 6, wherein the L-band EDFA comprises: an isolator for one-way transmission of an L-band input optical signal; a pump laser diode for outputting a third pump optical signal; a third coupler for combining the L-band input optical signal outputted from the isolator with a third pump optical signal outputted from the PLD; and an erbium-doped fiber configured (EDF) for amplifying the L-band input optical signal by using the third pump optical signal.

9. An optical amplifier, comprising: a gain flattening filter configured for flattening a gain of an optically amplified first input optical signal and outputting light reflected during the gain flattening; a coupler for combining the reflected light with a second input optical signal; and a rare-earth element doped optical fiber amplifier configured for amplifying the second input optical signal by using the reflected light as a first pump optical signal.

10. The optical amplifier of claim 9, wherein the reflected light comprises a portion of the optically amplified first input optical signal filtered by the gain flattening filter and spontaneous emission light generated by the optical amplification.

11. The optical amplifier of claim 9, wherein the first input optical signal comprises a C-band wavelength division multiplexing (WDM) optical signal, and the second input optical signal comprises a L-band WDM optical signal.

12. The optical amplifier of claim 9, wherein the rare-earth element doped optical fiber amplifier comprises: an isolator for one-way transmission of the second input optical signal; a pump laser diode for outputting a second pump optical signal; a coupler for combining the second input optical signal outputted from the isolator with the second pump optical signal outputted from the PLD; and an erbium-doped optical fiber configured for amplifying the second input optical signal by using the second pump optical signal.

13. A method for amplifying an L-band optical signal, comprising:
   optically amplifying a C-band input optical signal to impart a gain;
   flattening the gain of the optically amplified C-band input optical signal and outputting the gain-flattened optically amplified C-band input optical signal and light reflected during the gain flattening;
   combining an L-band input optical signal with the reflected light; and
   amplifying the L-band input optical signal by using the reflected light as a pump optical signal.

14. The method of claim 13, wherein the reflected light comprises a portion of the optically amplified C-band input optical signal filtered by the gain flattening filter and spontaneous emission light generated by the optical amplification.

15. An optical amplifier, comprising: a gain flattening filter configured for gain flattening an optically amplified first input optical signal by filtering out a portion of the optically amplified first input optical signal; and an amplifier in optical communication with the gain flattening filter configured for amplifying a second input optical signal using the filtered portion of the optically amplified first input optical signal as an optical pump.

16. The optical amplifier of claim 15, wherein the gain flattening filter filters out the portion of the optically amplified first input optical signal by reflection.

17. The optical amplifier of claim 15, wherein the amplified first input optical signal comprises a C-band optical signal and the second input optical signal comprises an L-band optical signal.

18. The optical amplifier of claim 15, wherein the amplifier comprises an erbium-doped optical fiber.

19. The optical amplifier of claim 15, further comprising a coupler that combines the filtered portion of the optically amplified first input optical signal with the second input optical signal, and sends the combined signal to the amplifier.

20. An optical communication system comprising the optical amplifier of claim 15.

21. A method of amplifying a first optical signal, comprising:
   amplifying a second optical signal;
   gain flattening the amplified second optical signal by filtering out a portion of the amplified second optical signal; and
   amplifying the first optical signal using the filtered portion of the amplified second optical signal as an optical pump.

22. The method of claim 21, wherein the first optical signal comprises an L-band optical signal and the second optical signal comprises a C-band optical signal.

23. The method of claim 21, wherein the portion of the amplified second optical signal is filtered out by optical reflection.

* * * * *